United States Patent [19]

Amin et al.

[11] Patent Number: 5,433,584
[45] Date of Patent: Jul. 18, 1995

[54] BEARING SUPPORT HOUSING

[75] Inventors: Mohamed-Samy A. Amin, Mississauga; Anthony J. Matthews, Georgetown, both of Canada

[73] Assignee: Pratt & Whitney Canada, Inc., Longueuil, Canada

[21] Appl. No.: 239,070

[22] Filed: May 5, 1994

[51] Int. Cl.⁶ .............................................. F01D 25/16
[52] U.S. Cl. ....................................... 415/229; 415/9; 415/230
[58] Field of Search ................. 415/9, 110, 111, 112, 415/113, 170.1, 174.2, 174.3, 174.4, 229, 230, 231; 384/99, 535

[56] References Cited

U.S. PATENT DOCUMENTS 4,639,188 1/1987 Swadley ................................ 415/9
5,237,817 8/1993 Bornemisza et al. ............. 415/229

FOREIGN PATENT DOCUMENTS 2043791 10/1980 United Kingdom ................ 415/113

OTHER PUBLICATIONS

*The Pratt & Whitney PW305 Engine*, Descriptive Notes, Jan. 1991, p. 20.

*Primary Examiner*—Edward K. Look
*Assistant Examiner*—Christopher Verdier

[57] ABSTRACT

A bearing support housing for turbomachines like gas turbine engines. The housing is a one piece component having a flexible forward portion and rigid rearward portions, resulting in a housing having a unique combination of properties that allow for normal running of the engine as well as safe operation during unplanned rotor imbalances.

3 Claims, 1 Drawing Sheet

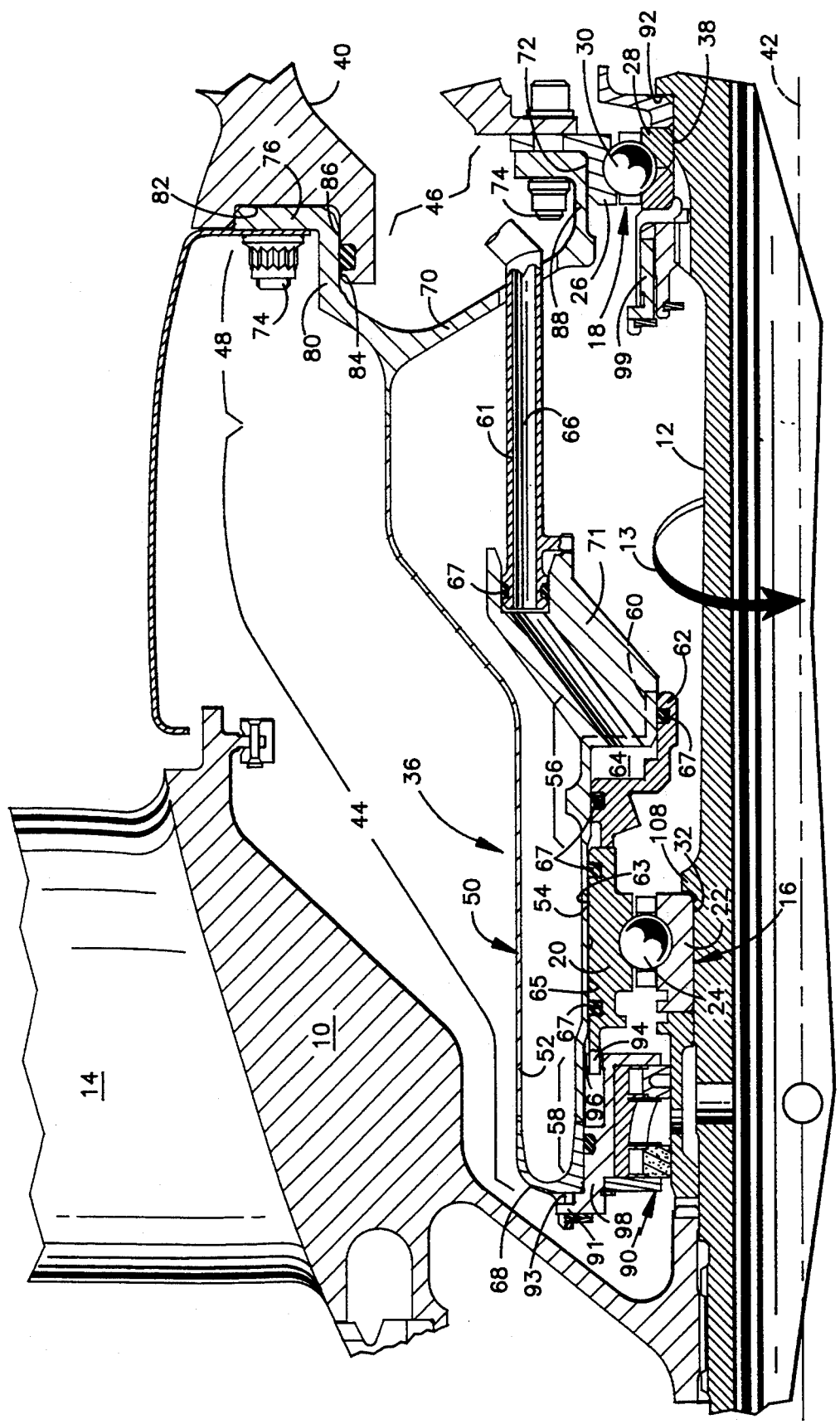

BEARING SUPPORT HOUSING

Technical Field

This invention relates to gas turbine engines, and in particular, to bearing support housings for gas turbine engines.

BACKGROUND OF THE INVENTION

Turbomachines such as gas turbine engines include a fan section, a compressor section, a combustion section, and a turbine section. A shaft extends axially through the engine from the fan section through the turbine section and rotates axially spaced apart stages of disks. Each disk carries circumferentially spaced apart blades that extend radially across a gas flow path. The shaft is supported by one or more bearing assemblies. The bearing assemblies are connected to the case by a bearing support housing. The housing serves several purposes; it supports the bearing assemblies, it provides a closed environment for lubricating oil, and it retains the bearing assembly, and thereby retains the shaft in the event of a fan disk imbalance or any other unexpected event.

While various designs for bearing housings have been proposed and used in the gas turbine engine, improved designs are required to provide optimum operating characteristics for advanced engines. The present invention satisfies this industry need.

SUMMARY OF THE INVENTION

According to this invention, a bearing support housing for a turbomachine that is comprised of an engine case, a shaft extending axially through the engine case, and axially spaced apart first and second bearing assemblies for supporting the shaft within the case, wherein the bearing assemblies are comprised of an outer bearing race, an inner bearing race fixed to the shaft, and a bearing between the races, comprises: a flexible first bearing housing portion comprised of axially extending and radially spaced apart walls that are parallel to the shaft, wherein the inner surface of the radially inward wall is adjacent to the outer bearing race of the upstream bearing, said inward wall including sections extending upstream from the race and downstream from the race, and wherein said outward wall includes a section that extends axially downstream and radially outwardly towards the engine case; a rigid second bearing housing portion comprised of a wall extending axially upstream and radially outwardly from the outer bearing race surface of the downstream bearing towards the engine case, wherein the second bearing housing portion is fixed to the outer bearing race; and a rigid third bearing housing portion comprised of a wall extending axially upstream and radially inwardly from the engine case, wherein the third bearing housing portion is fixed to the engine case; the first, second and third bearing housing portions meet at a point located axially intermediate and radially outward of said first and second bearing assemblies.

The combination of a flexible portion at the upstream end of the housing and a rigid portion at the downstream end of the housing result in an engine component having unique performance characteristics. In particular, the housing has the necessary stiffness to provide for stable rotor dynamics during normal engine operating regimes, and is able to withstand impact by a variety of foreign objects during engine operation and still function in an acceptable manner.

Other features and advantages of the invention will be apparent from the figure and the description of the best mode for carrying out the invention, as described below.

BRIEF DESCRIPTION OF THE DRAWING

The FIGURE is a cross-sectional view showing the bearing area of a gas turbine engine in accordance with the present invention.

DESCRIPTION OF THE PREFERRED EMBODIMENT

Modern gas turbine engines include a fan section at the upstream end of the engine and a turbine section at the axially downstream end of the engine. Between the fan and turbine sections is a compressor section and a combustor section. A shaft extends axially through the engine. Engine designs are known that utilize only one shaft; other designs are known that utilize two or more shafts. The present invention has application to single as well as multi-shaft engines. In the FIGURE, the shaft is indicated by the reference numeral 12; its direction of rotation during engine operation is shown by the arrow marked with reference numeral 13.

The fan disk 10 is rotationally fixed to the shaft 12. The disk 10 includes a plurality of circumferentially spaced apart blades 14 that extend radially outwardly across an air flowpath. The shaft 12 is supported by at least two bearing assemblies 16 and 18; as shown in the FIGURE, a first bearing assembly 16 (sometimes referred to herein as the #1 bearing) is spaced axially upstream of the second bearing assembly 18 (sometimes referred to as the #2 bearing). The bearing assemblies 16, 18 are either of the ball bearing type or the roller bearing type, and include a pair of radially spaced apart bearing races, and a plurality of circumferentially spaced apart bearings therebetween. In particular, the upstream bearing assembly 16 includes an outer bearing race 20 and an inner bearing race 22 that cooperate to surround the bearings 24 and maintain them in an operating position. Likewise, the downstream bearing assembly 18 includes an outer bearing race 26, an inner bearing race 28, and bearings 30.

With respect to the upstream bearing assembly 16, the radially inner surface 32 of the inner bearing race 22 is rotationally fixed to the shaft 12; the outer bearing race 20 is axially moveable with respect to the bearing support housing 36, and therefore, with respect to the shaft 12. In the downstream bearing assembly 18, the radially inner surface 38 of the inner bearing race 28 is rotationally fixed to the shaft 12, and the radially outer surface 72 of the outer bearing race 26 is fixed to the bearing support housing 36. The bearing support housing 36 as shown in the FIGURE is fixed to the engine case through an intermediate case 40. However, for purposes of this invention, the bearing support housing 36 may be directly attached to the engine case, or to any other support that is rigidly attached to the case. The engine case and shaft 12 are coaxial, and the axis of the engine is represented by the reference numeral 42.

As indicated above, this invention concerns axially spaced apart bearing assemblies 16, 18 that are supported by a bearing support housing 36. In the preferred embodiment of the invention, the outer race 26 of the downstream bearing assembly 18 is fixed to the bearing housing 36, and the outer race 20 of the upstream bearing assembly 16 is adjacent to, and axially slideable with respect to, the bearing housing 36. The housing 36 is fixed to the engine case through the intermediate case 40. The housing 36 is a one piece structure designed to maintain the axial and radial position of the shaft 12 during normal engine operation as well as during an unexpected rotor imbalance.

More particularly, the bearing support housing 36 is a one piece structure that is comprised of three portions; a first housing portion, indicated by the reference number 44, in the area of the upstream bearing assembly 16; a second housing portion, indicated by the reference number 46, in the area of the downstream bearing assembly 18; and a third housing portion, indicated by the reference number 48, in the area of attachment to the intermediate case 40. A key feature of the bearing support housing 36 of this invention is the combination of flexible and rigid portions in a single piece structure. Such a combination of properties results in the inventive housing having unique performance characteristics.

The first housing portion 44 is defined by a thin metal wall 50 that extends, adjacent to the shaft 12, in both forward and rearward directions from the #1 bearing assembly 16. In particular, the metal wall 50 forms a pair of closely spaced apart parallel legs 52, 54 which are also parallel to the shaft 12. The length of the parallel legs 52, 54 is approximately equal. The radially inner leg 54 includes a segment 56 that extends downstream from the #1 bearing assembly 16, and a segment 58 that extends upstream from the bearing assembly 16. The inner leg 54 also includes, at the downstream end of segment 56, an L-shaped bend 60 which rests upon structure 62 to provide an oil reservoir 64 for feeding the bearing 24. The reservoir 64 is in communication with the bearing 24 through a channel (not shown) that extends from the reservoir 64 to the bearing race 22. The reservoir 64 also feeds the gap between the bearing race outer surface 63 and the housing inner surface 65. Oil sealing rings are shown at 67. Oil is fed into the reservoir 64 through an oil line 66 which extends through tube 61 and through an extension 71 in the housing 36. The extension 71 may be integral with the housing 36, as shown, or it may be attached to it in a convention fashion. Oil line 66 also provides lubrication to the bearing 30 by a channel (not shown). Forward of the upstream bearing 24, the inner leg 54 transitions into the outer leg 52 by means of a hairpin-type bend 68. The outer leg 52 parallels the inner leg 54; at a point downstream of the #1 bearing assembly 16, and downstream of the parallel legs 52, 54, the first portion 44 of the housing 36 extends radially outward towards the intermediate case 40 and engine case.

The second portion 46 of the bearing housing 36 occupies the area near the #2 bearing assembly 18. The second housing portion 46 is defined by a wall 70 having a greater thickness than the thickness of the wall 50 that defines the first housing portion 44; the second housing portion 46 is fixed to the #2 bearing 18 and extends axially upstream and radially outwardly from the #2 bearing assembly 18 assembly towards the engine case and intermediate case 40. In particular, the wall 70 is fixed to the outer surface 72 of the outer race 26 by bolt 74 which passes through bolt holes (not shown) in the wall 70 and race 26.

As is seen in the FIGURE, the third housing portion 48 is comprised of a thick metal wall 80 that extends axially upstream and radially inwardly from the case 40. The third bearing housing portion 48 is fixed to the intermediate case 40 by bolts 74 which extend through bolt holes (not shown) in a radially extending land 76 of the third housing portion 48. The land 76 abuts a radially extending surface 82 in the intermediate case 40. The third portion 48 also includes axially extending surface 84 which abuts axially extending surface 86 on the intermediate case 40. The aforementioned design protects the locating bolts 74 from shear in the event of a large out-of-balance load during engine operation.

The first, second and third housing portions 44, 46, 48 meet at, and are contiguous from, a point located axially intermediate and radially outward of the first and second bearing assemblies 16, 18, respectively. The housing 36 is fabricated using known metalworking techniques; preferably, the first housing portion 44 is a combination of sheet metal and casting or wrought components, welded together. The second and third housing portions 46, 48 are preferably a single piece casting or wrought metal component. The first housing portion 44 is joined to the second and third portions 46, 48 by welding or other conventional metal joining techniques. Titanium is the preferred material from which the housing 36 is fabricated.

The thickness of the second housing bearing wall 70 is greater than the thickness of the first bearing housing wall 50. The length of the second housing bearing wall 70 is less than the first bearing housing wall 50. These two features result in the second bearing housing wall 70 being significantly more rigid, and less flexible, than the first bearing housing wall 50. The combination of these flexibilities and stiffness plays an important role in providing the correct rotor dynamic characteristics during normal operating regimes of the engine and in maintaining such stability during unplanned rotor imbalances. Such rotor imbalances can occur during bird strikes, or the ingestion of other foreign objects during engine operation; other causes of rotor imbalances are known. In the event that, for example, a large bird is ingested by the engine during engine operation and strikes the bearing housing 36, the first bearing housing portion 44 will collapse due to its inherently weaker structure. If the first bearing housing 44 collapses due to a bird strike, the load transmitted through the second housing bearing portion 46 to the intermediate case 40 and engine case is reduced because some of the energy from an out-of-balance rotor is dissipated by the deformation of the first bearing housing 44. The second bearing housing portion 46 will remain intact and provide the necessary radial and axial retention to the shaft 12. Further, the intermediate case 40 and engine mount structure will be protected from fracture, which could otherwise result in an uncontained failure of the shaft 12 and the engine, both of which must be prevented.

As seen in the FIGURE, the wall 70 that defines the second bearing housing portion 46 includes area 88 of reduced thickness near the attachment point to the second bearing assembly 18. In the event that the bearing housing 36 experiences a stress higher than predicted, and the second housing portion 46 fails, it will fail through the reduced thickness area 88. The remainder of the housing 36 will remain intact and stationary, which will prevent forward axial movement of the second bearing assembly 18. More specifically, even after failure, the housing 36 will remain attached to the first bearing assembly 16 and the intermediate case 40. Such attachment will maintain the axial and radial position of the housing portions that are upstream of the failure point. These stationary, upstream parts of the housing 36 will block movement in both the radial and axial direction of parts of the housing 36 that are downstream of the failure point. As a result, the fan 10 and shaft 12 will remain contained within the engine case.

The inner bearing race 22 is axially retained to the shaft 12 by a radially extending shoulder 108 on the shaft 12 on the downstream side of the inner bearing race 22, and by a carbon seal assembly 90 on the upstream side of the bearing race 22. The carbon seal assembly 90 is axially restrained by the fan disk 10 to the shaft 12 by conventional means. It is also retained to the housing 36 by radially extending dog 91 which passes through slot 93 in the housing 36. As indicated above, the outer race 20 is axially slideable with respect to the housing 36, and oil is fed into the gap between the race 20 and housing 36 to provide oil damping. Relative axial movement between the race 20 and housing 36 is permitted by a dog and slot arrangement; in particular, a dog 94 in the race 20 passes through the slot 96 in the carbon seal outer race 98. While the preferred embodiment of the invention utilizes the moveable outer bearing race design, an axially fixed outer bearing race is also contemplated. The second bearing assembly 18 is axially fixed to the shaft 12 by a radially extending shoulder 92 on the shaft 12 at the downstream side of the inner bearing race 28, and by a lock nut assembly 99 attached to the shaft 12 at the upstream side of the bearing race 28.

Although this invention has been shown and described with respect to a preferred embodiment thereof, it will be understood by those skilled in the art that various changes in form and detail thereof may be made without departing from the spirit and scope of the claimed invention. For example, the bearing support housing of this invention is applicable to single shaft turbomachines as well as multi-shaft machines. Further, while the housing is preferably fabricated from titanium, other metal alloys may be used, as well as nonmetallic materials such as composites.

We claim:

1. A bearing support housing for a turbomachine comprised of an engine case, a shaft extending axially through the engine case, and axially spaced apart first and second bearing assemblies for supporting the shaft within the case, wherein the bearing assemblies are comprised of an outer bearing race, an inner bearing race fixed to the shaft, and a bearing therebetween, wherein said bearing support housing comprises:

a first bearing housing portion comprised of axially extending and radially spaced apart inward and outward walls parallel to the shaft, and wherein the inner surface of the radially inward wall is adjacent to the outer bearing race of the upstream bearing, said inward wall including sections extending upstream from the race and downstream from the race, and wherein said outward wall includes a section that extends axially downstream and radially outwardly towards the engine case;

a second bearing housing portion comprised of a wall extending axially upstream and radially outwardly from the outer bearing race of the downstream bearing towards the engine case, wherein the second bearing portion is fixed to the outer bearing race; and a third bearing housing portion comprised of a wall extending axially upstream and radially inwardly from the engine case, wherein the third bearing housing portion is fixed to the case, and wherein the first, second and third bearing housing portions meet axially intermediate and radially outward of said bearing assemblies;

wherein the thickness of the second bearing housing wall is greater than thickness of the first bearing housing wall and the length of the second bearing housing wall is less than the length of the first bearing housing wall.

2. The bearing support housing of claim 1, wherein the axial length of said radially spaced apart and parallel walls that comprise the first housing portion is approximately equal.

3. The bearing support housing of claim 1, wherein the third bearing housing portion includes axially and radially facing surfaces for abutting the axially and radially facing surfaces of the engine case.

* * * * *